(12) United States Patent
Davis

(10) Patent No.: US 8,108,559 B2
(45) Date of Patent: Jan. 31, 2012

(54) STANDARDIZING CLOCKS IN A NETWORKED COMPUTING ENVIRONMENT

(75) Inventor: Bradford C. Davis, Erie, CO (US)

(73) Assignee: Computer Associates Think, Inc., Islandia, NY (US)

(*) Notice: Subject to any disclaimer, the term of this patent is extended or adjusted under 35 U.S.C. 154(b) by 167 days.

(21) Appl. No.: 12/714,475

(22) Filed: Feb. 27, 2010

(65) Prior Publication Data

US 2010/0153585 A1 Jun. 17, 2010

Related U.S. Application Data

(63) Continuation-in-part of application No. 12/248,742, filed on Oct. 9, 2008, now abandoned, which is a continuation of application No. 10/890,314, filed on Jul. 12, 2004, now abandoned.

(60) Provisional application No. 60/486,596, filed on Jul. 11, 2003.

(51) Int. Cl.
*G06F 15/16* (2006.01)
(52) U.S. Cl. ........................ 709/248; 713/400
(58) Field of Classification Search .................. 709/200, 709/248; 713/400
See application file for complete search history.

(56) References Cited

U.S. PATENT DOCUMENTS

| | | | |
|---|---|---|---|
| 5,371,852 A | 12/1994 | Attanasio et al. | 395/200 |
| 5,784,421 A | 7/1998 | Dolev et al. | 375/354 |
| 6,311,283 B1 | 10/2001 | Gonzalez | 713/400 |
| 6,324,586 B1 | 11/2001 | Johnson | 709/248 |
| 6,665,541 B1 | 12/2003 | Krasner et al. | 455/502 |
| 6,718,395 B1 | 4/2004 | Ziegler | 709/248 |
| 6,725,278 B1 | 4/2004 | Gonzalez | 709/248 |
| 6,836,851 B2 * | 12/2004 | Dive | 713/400 |
| 6,981,063 B1 | 12/2005 | Eggers et al. | 709/248 |
| 7,023,816 B2 | 4/2006 | Couillard | 370/324 |
| 7,035,246 B2 | 4/2006 | Taylor | 370/350 |
| 7,237,036 B2 | 6/2007 | Boucher et al. | 709/245 |
| 7,263,626 B2 | 8/2007 | Kerö et al. | 713/400 |
| 7,283,568 B2 | 10/2007 | Robie, Jr. et al. | 370/503 |
| 7,372,875 B2 | 5/2008 | Hadzic et al. | 370/516 |

(Continued)

OTHER PUBLICATIONS

Notification of Transmittal of the International Search Report and the Written Opinion of the International Searching Authority for International Application No. PT/US04/22548, filed Jul. 12, 2004 (8 pgs) mailed Sep. 30, 2005.

(Continued)

*Primary Examiner* — Moustafa M Meky
(74) *Attorney, Agent, or Firm* — Baker Botts L.L.P.

(57) ABSTRACT

A method includes communicating, at a first time and from a first to a second machine, a first time correction amount. The method includes receiving, at a second time and from the second machine, a first corrected time of the second machine that is a first current clock time of the second machine corrected according to the first time correction amount. The method includes determining: a difference between the first time and the first corrected time; a first round trip time comprising a difference between the first and second times; and a second time correction amount comprising a sum of the difference between the first time and the first corrected time and half of the first round trip time. The method includes determining whether the second time correction amount should be applied to the second machine clock time and, when so, initiating, at a third time, a process by which the second time correction amount is applied to the second machine clock time.

22 Claims, 3 Drawing Sheets

U.S. PATENT DOCUMENTS

| | | | | |
|---|---|---|---|---|
| 7,539,793 | B2 * | 5/2009 | Foster et al. | 710/61 |
| 2001/0054064 | A1 | 12/2001 | Kannan | 709/203 |
| 2002/0007465 | A1 * | 1/2002 | Dive | 713/400 |
| 2002/0120416 | A1 | 8/2002 | Liu et al. | 702/79 |
| 2003/0004774 | A1 | 1/2003 | Greene et al. | 705/8 |
| 2003/0028691 | A1 | 2/2003 | Burkes et al. | 710/15 |
| 2003/0084190 | A1 | 5/2003 | Kimball | 709/248 |
| 2004/0028162 | A1 | 2/2004 | Skahan, Jr. et al. | 375/356 |
| 2004/0073718 | A1 | 4/2004 | Johannessen et al. | 709/400 |
| 2005/0188082 | A1 | 8/2005 | Davis | 709/224 |
| 2009/0157905 | A1 | 6/2009 | Davis | 709/248 |

OTHER PUBLICATIONS

Palumbo, Daniel L., "The Derivation and Experimental Verification of Clock Synchronization Theory," IEEE Transactions on Computers, vol. 43, No. 6, Jun. 1994, (11 pgs).

Gurewitz et al., "Network Time Synchronization Using Clock Offset Optimization," 11th IEEE International Conference on Network Protocols, 2003, pp. 212-221, Nov. 2003, (10 pgs).

Mills, David L., "Network Time Protocol (Ver. 30 Specification, Implementation, and Analysis," Internet Engineering Task Force RFC 1305, Mar. 1992, (120 pgs).

*United States Patent and Trademark Office, Office Action* for U.S. Appl. No. 12/248,742, filed Oct. 9, 2008 in the name of Bradford C. Davis, (7 pgs), Notification Date Aug. 31, 2009.

*United States Patent and Trademark Office, Office Action* for U.S. Appl. No. 10/890,314, filed Jul. 12, 2004 in the name of Bradford C. Davis, (6 pgs), Notification Date Jul. 5, 2006.

*United States Patent and Trademark Office, Office Action* for U.S. Appl. No. 10/890,314, filed Jul. 12, 2004 in the name of Bradford C. Davis, (7 pgs), Notification Date Dec. 28, 2006.

*United States Patent and Trademark Office, Office Action* for U.S. Appl. No. 10/890,314, filed Jul. 12, 2004 in the name of Bradford C. Davis, (8 pgs), Notification Date Apr. 2, 2007.

*United States Patent and Trademark Office, Office Action* for U.S. Appl. No. 10/890,314, filed Jul. 12, 2004 in the name of Bradford C. Davis, (8 pgs), Notification Date Aug. 1, 2007.

*United States Patent and Trademark Office, Office Action* for U.S. Appl. No. 10/890,314, filed Jul. 12, 2004 in the name of Bradford C. Davis, (8 pgs), Notification Date Apr. 9, 2008.

European Patent Office Communication transmittal of the Supplementary European Search Report under Article 153(7) EPC for Application No. 04778186.9-1229/1652038 PCT/US2004022549, Ref: HCD/J00048470EP, dated Apr. 12, 2010, (2 pgs).

T. Yamashita et al., "A Precise Clock Synchronization Method Using ISDN," Systems and Computer in Japan, vol. 30, No. 5, 1999, translated from Denshi Joho Tsushin Gakkai Ronbunshi, vol. J81-D-1, No. 4, Apr. 1998-pp. 377-385; 1999 Scripta Technical, Syst Comp Jpn, vol. 30, No. 5 (May 1999), XP-002575630, pp. 38-46 (9 pgs).

J. L. Jespersen et al., "Satellite VHF Transponder Time Synchronization," Proceedings of the IEEE, New York, NY, vol. 56, No. 7, Jul. 1968, XP-002575631, pp. 1202-1206 (5 pgs).

K. Ramamritham et al., "Using Windows NT for Real-Time Applications: Experimental Observations and Recommendations," Proceedings Fourth IEEE Real-Time Technology and Applications Symposium Jun. 3-5, 1998, Denver, CO, (May 3, 1998), Computer Science Dept., XP-002575642, pp. 102-111 (10 pgs), document undated: represented in EPO Communication (Item 1) as being May 3, 1998.

* cited by examiner

STANDARDIZING CLOCKS IN A NETWORKED COMPUTING ENVIRONMENT

CROSS-REFERENCE TO RELATED APPLICATIONS

This application is a continuation-in-part of U.S. patent application Ser. No. 12/248,742, filed Oct. 9, 2008, which is a continuation of U.S. patent application Ser. No. 10/890,314, filed Jul. 12, 2004, which claims the benefit U.S. Provisional Patent Application No. 60/486,596 entitled SYSTEM AND METHOD FOR STANDARDIZING CLOCKS IN A HETEROGENEOUS NETWORKED ENVIRONMENT, filed on Jul. 11, 2003, the entire disclosures of which are incorporated herein by reference.

TECHNICAL FIELD

This disclosure relates generally to computer systems, and more particularly to standardizing clocks in a networked computing environment.

BACKGROUND

Machines such as computers and computer processors typically include a clock. However, the clocks in different machines, including those machines that are in the same time zone and where some form of time normalization software has been deployed, frequently differ by some amount of time (e.g., by a number of seconds). Clock differences also accrue as a result of time-zone differences that further complicate the normalization effort.

SUMMARY

According to certain embodiments of the present disclosure, disadvantages and problems associated with previous techniques for clock synchronization may be reduced or eliminated.

A method includes communicating, at a first time and from a first to a second machine, a first time correction amount. The method includes receiving, at a second time and from the second machine, a first corrected time of the second machine that is a first current clock time of the second machine corrected according to the first time correction amount. The method includes determining: a difference between the first time and the first corrected time; a first round trip time comprising a difference between the first and second times; and a second time correction amount comprising a sum of the difference between the first time and the first corrected time and half of the first round trip time. The method includes determining whether the second time correction amount should be applied to the second machine clock time and, when so, initiating, at a third time, a process by which the second time correction amount is applied to the second machine clock time.

Certain embodiments of the present disclosure may provide one or more technical advantages. In certain embodiments, the clock synchronization technique of the present disclosure allows two or more machines to substantially synchronize the clock time of their clocks using minimal processing power and time. Certain embodiments may substantially synchronize clocks of machines throughout an enterprise, which may allow integrated logs to be shown across the enterprise. Reliable synchronization of clocks may allow the logs to be integrated across heterogeneous products across the enterprise. In certain embodiments, the present disclosure provides a relatively inexpensive technique for synchronizing the clocks of multiple machines.

Certain embodiments of the present disclosure may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1:
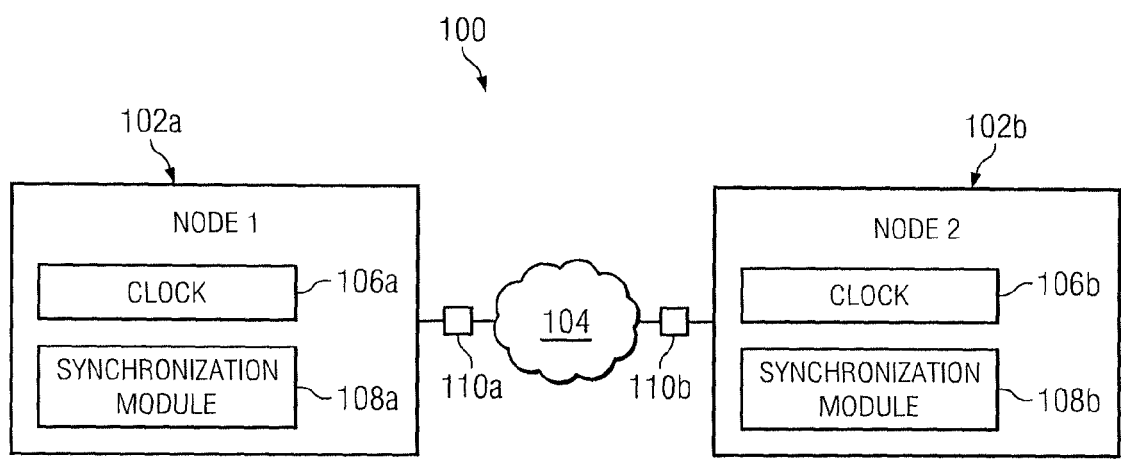
FIG. 1 illustrates an example system for standardizing clocks in a networked computing environment, according to certain embodiments of the present disclosure.

FIG. 1 illustrates an example system 100 for standardizing clocks in a networked computing environment, according to certain embodiments of the present disclosure. In the illustrated example, system 100 includes machines 102a and 102b, which are operable to communicate over a network 104. Although this particular implementation of system 100 is illustrated and primarily described, the present disclosure contemplates system 100 being implemented in any suitable manner, according to particular needs.

Machines 102a (also identified as node 1) and 102b (also identified as node 2) may be any device already known or that will be known in the future that keeps time, with one or more clocks on the device for example. For example, machines 102 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, laptop, workstation, network computer, kiosk, wireless data port, cellular phone, smart phone, personal data assistant (PDA), one or more Internet Protocol (IP) telephones, one or more servers, a server pool, one or more processors within these or other devices, or any other suitable processing device.

Machines 102 may be implemented using any suitable combination of software, firmware, and hardware. Each computer system of system 100 may include one or more processors and one or more memory units. Although a particular number of machines 102 are illustrate and primarily described, the present disclosure contemplates system 100 including any suitable number of machines 102, according to particular needs. Additionally, machines 102 may be of the same or different types and/or may have the same or different configurations, in any suitable combination.

Machines 102 may be operable to communicate through network 104 for communicating to each other and to other machines. Network 104 may communicatively couple machines 102 to one another. Network 104 facilitates wireless or wireline communication. Network 104 may communicate, for example, Internet Protocol (IP) packets, Frame Relay frames, Asynchronous Transfer Mode (ATM) cells, voice, video, data, and other suitable information between network addresses. Network 104 may include one or more local area networks (LANs), radio access networks (RANs), metropolitan area networks (MANs), wide area networks (WANs), all or a portion of the global computer network known as the Internet, and/or any other communication system or systems at one or more locations.

Each machine 102 may include a clock 106, which may generate a clock time. Clock 106 may be implemented in any suitable manner, and using any suitable combination of software, firmware, and hardware. In certain embodiments, clock 106 is a system clock. The time, or clock count, maintained by clock 106 may represent the number of "ticks" since an arbitrary start date and time. The ticks may represent any suitable time interval. A particular example clock 106 may be implement UNIX or POSIX time, which encodes time as the number of seconds elapsed since Jan. 1, 1970, at 00:00:00 Universal Time. Although these particular example clocks have been described, the present disclosure contemplates clocks 106 being any suitable types of clocks associated with machines 102 for which standardization may be desired.

The clock time of clocks 106 of different machines 102 may differ by some unknown quantity and embodiments of the present disclosure quantify and adjust for this unknown to a suitable degree, normalized for differences in time zone and daylight savings time, which may simultaneously be in effect and not be in effect on machines 102 in different time zones. The clock difference between clocks 106 of different machines 102 may result from any suitable cause, such as clock drift. The clock difference between two clocks 106 at a given time is generally unknown to each machine 102. The clock difference is considered constant across any short duration of time, assuming that whatever clock drift may exist in a particular clock does not manifest within the space of a given round trip communication, described in more detail below.

In certain embodiments, each machine 102 includes a synchronization module 108. In the illustrated example, machine 102a includes synchronization module 108a, and machine 102b includes synchronization module 108b. Synchronization module 108 may be implemented using any suitable combination of hardware, firmware, and software.

Synchronization modules 108 may be operable to participate in the standardization of clocks 106 of different machines 102. In general, standardizing of clocks 106 of different machines 102 refers to a process of synchronizing clocks 106 of two or more machines 102. It should be understood that two or more clocks 106 being synchronized does not necessarily indicate that the clock times of the clocks 106 of the two or more machines 102 match exactly. As will be described in greater detail below, in certain embodiments, a clock 106 of one machine (e.g., machine 102b) may be synchronized to a clock 106 of another machine (e.g., machine 102a) when the time correction amount to be applied to the clock of machine 102b reaches an acceptable amount. The terms standardize, synchronize, and normalize, as well as their associated variations, may be used interchangeably throughout this disclosure. In certain embodiments, the process for standardizing clocks applied by the present disclosure reflects certain principles of the mathematical Sandwich Theorem (also known as the Squeeze Theorem).

Synchronization modules 108 of those machines 102 being synchronized may cooperate by passing one or more messages 110 to one another to accomplish the synchronization. Messages being passed from machine 102a to machine 102b will be referred to as messages 110a, while messages being passed from machine 102b to machine 102a will be referred to as messages 110b. In certain embodiments, synchronization modules 108 operate in a master-slave configuration during the synchronization process. For example, a first machine 102 (e.g., machine 102a) may operate as the master, while one or more other machines 102 (e.g., machine 102b) may operate as slaves. Clock 106 of the master, or lead, machine 102 may be the clock to which slave, or follower, machines 102 may synchronize their clocks 106. The master machine 102 may be the machine that initiates the synchronization process.

In certain embodiments, more than one, if not all, machines 102 may act as a master node when appropriate. For example, synchronization module 108 on each machine 102 may be operable to cause that machine 102 to act as a master node for one or more instances of synchronization. The determination of which machine 102 will act as a master for an instance of synchronization may be determined in any suitable manner, according to particular needs. For example, the machine 102 that initiates an instance of synchronization with one or more other machines 102 may be the master node for that instance of synchronization. Additionally or alternatively, in certain embodiments, only one or more machines 102 are dedicated as master machines 102.

An instance of synchronization between two machines 102 may refer to a number of iterations through the synchronization process to achieve a desirable level of synchronization. For example, an instance of synchronization may begin about the time the master machine 102 communicates an initial time correction amount to another machine 102 (as described in greater detail below) until the synchronization process completes, which may consist of multiple iterations through the synchronization process. A new instance of the synchronization process may begin at a later time. For example, an instance of the synchronization process may be run at any suitable interval (e.g., a few times an hour) and keep an entire enterprise or other entity synchronized. An example of the synchronization process of embodiments of the present disclosure is described in greater detail below with reference to FIGS. 2 and 4.

Embodiments of the present disclosure (including, for example, synchronization module 108) may include logic contained within a medium. Logic may include hardware, software, and/or other logic. The medium in which the logic is encoded may include a tangible medium, such as a transitory or non-transitory medium. The logic may perform operations when executed by one or more processors. Certain logic may include a computer program, software, computer executable instructions, and/or instructions capable being executed by machine 102. The logic may also be embedded within any other suitable medium without departing from the scope of the disclosure.

Certain embodiments of the present disclosure may provide one or more technical advantages. In certain embodiments, the clock synchronization technique of the present disclosure allows two or more machines 102 to substantially synchronize the clock time of their clocks 106 using minimal processing power and time. Certain embodiments may substantially synchronize clocks 106 of machines 102 throughout an enterprise, which may allow integrated logs to be shown across the enterprise. Reliable synchronization of clocks 106 may allow the logs to be integrated across heterogeneous products across the enterprise. In certain embodiments, the present disclosure provides a relatively inexpensive technique for synchronizing clocks 106 of multiple machines 102.

In certain embodiments, the synchronization technique of the present disclosure provides a relatively precise synchronization at reduced and/or minimal processing cost. For example, although the present disclosure contemplates synchronizing clocks 106 of two or more machines 102 to within any suitable amount, certain embodiments may achieve synchronization to about 50 microseconds or less, down to zero, between two or more machines 102. As another example, certain embodiments may be able to achieve these levels of synchronization with minimal processing costs, with acceptable levels of synchronization being achieved in about five milliseconds or less, down to less than a millisecond. In certain embodiments, the CPU impact of running the synchronization process is negligible. Additionally, given the minimal processing impact, the synchronization process may be run more frequently relative to conventional synchronization techniques. The ability to run the instances of the synchronization process more frequently may help ensure that two or more clocks 106 of two or more machines 102 are relatively synchronized on a more consistent basis, rather than waiting a longer period to synchronize (which may allow the clocks to drift apart even further). This may help improve the consistency of clocks 106 over time and further reduce the processing time at each instance of standardization (i.e., since, at each instance of synchronization, the clocks will likely be relatively close in time).

Embodiments of the present disclosure may be used in any suitable context and may provide one or more of the above-described advantages in those contexts. As just one example context, embodiments of the present disclosure may facilitate using an n-gigabit network (e.g., a one-gigabit network) as a virtual machine by allowing the clocks 106 of various machines 102 within the n-gigabit network to be substantially synchronized. It should be understood that this example context is provided for example purposes only and should not be used to limit the present disclosure.

Certain embodiments may allow integrated logs to be shown across an enterprise or other entity. For example, certain embodiments may allow the date/time logs for multiple machines 102, including machines of heterogeneous products across an enterprise or other entity, to be sorted or otherwise processed in a single log.

Figure 2:
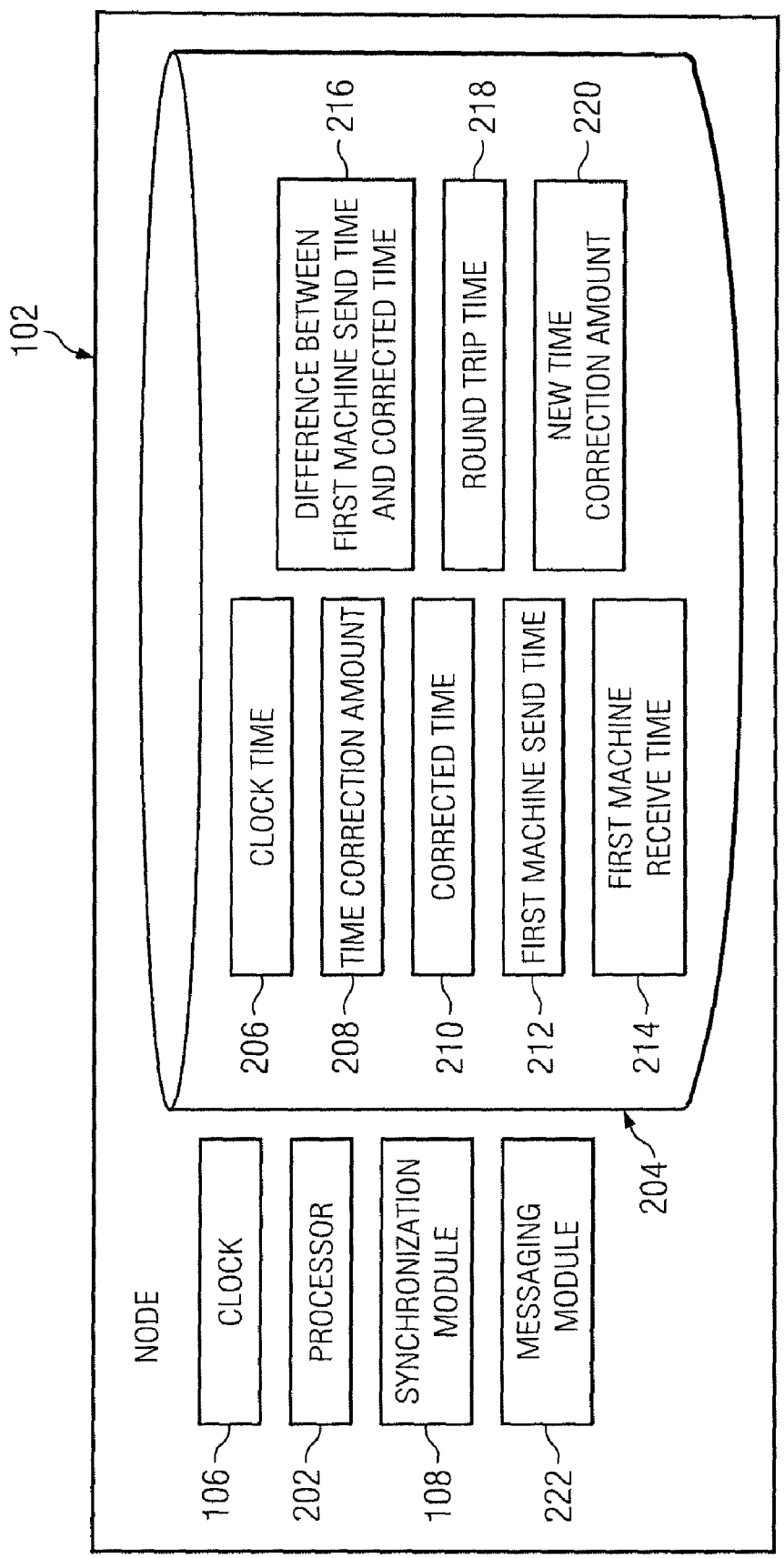
FIG. 2 illustrates additional example details of an example machine, according to certain embodiments of the present disclosure.

FIG. 2 illustrates additional example details of an example machine 102, according to certain embodiments of the present disclosure. Although machine 102 is illustrated as including particular components in a particular configuration, the present disclosure contemplates machine 102 including any suitable components in any suitable configuration. For example, machine 102 may include additional components, fewer components, combinations of the illustrated and described components, and/or different components.

Machine 102 may include clock 106 and synchronization module 108, as described above with reference to FIG. 1. Machine 102 may include one or more processors 202 and one or more memory units 204. Each processor 202 may include one or more microprocessors, controllers, or any other suitable computing devices or resources and may work, either alone or with other components of system 100, to provide a portion or all of the functionality of system 100 described herein. Each memory unit 204 may take the form of volatile and/or non-volatile memory including, without limitation, magnetic media, optical media, random access memory (RAM), read-only memory (ROM), removable media, registers, and/or any other suitable memory component. A portion or all of memory unit 204 may be remote from machine 102, if appropriate.

In certain embodiments, memory units 204 may store various information to be used (e.g., by synchronization module 108) during the synchronization process. Although particular information is illustrated and primarily described, the present disclosure contemplates memory units 204 storing any suitable information according to particular needs.

In certain embodiments, memory units 204 store a clock time 206, a time correction amount 208, a corrected time 210 of the second machine, a first machine send time 212, a first machine receive time 214, a difference 216 between first machine send time 212 and a corrected time (e.g., corrected time 210) of the second machine (e.g., second machine 102b), a round trip time 218, and a new time correction amount 220. Clock time 204 may represent the current clock time of clock 106. Additionally or alternatively, as described in greater detail below, clock time 204 may represent the output of clock 106 with time correction amount 208 applied to that output of clock 106.

Time correction amount 208, corrected time 210, first machine send time 212, first machine receive time 214, difference 216, round trip time 218, and new time correction amount 220 are described in greater detail below. Generally, time correction amount 208 represents the current time by which a machine 102's clock 106 is being reset to synchronize to another machine 102's clock. Initially, this value may be set to zero (or another suitable value), and its later value may be determined based on calculations made during the synchronization process. Corrected time 210 may be the corrected time of the second machine (e.g., machine 102b) after the second machine applies time correction amount 208. The master machine 102 (e.g., machine 102a) may receive this value in a message 110b from the second machine. First machine send time 212 may be the time of clock 106 at which machine 102 (e.g., machine 102a acting as a master node) sends a message 110a comprising a time correction amount (e.g., time correction amount 208). First machine receive time 214 may be the time of clock 106 at which machine 102 (e.g., machine 102a acting as a master node) receives a message 110b comprising a corrected time (e.g., corrected time 210) from a second machine (e.g., machine 102b acting as a slave node).

Difference 216 may be the difference between first machine send time 212 and corrected time 210 of the second machine (e.g., machine 102b). Round trip time 218 may represent a difference between first machine send time 212 and first machine receive time 214. New time correction amount 220 may be the next possible value for time correction amount 208 after an iteration through the synchronization algorithm. Ultimately, time correction amount 208 and/or new time correction amount 220 may reflect the final determined synchronization amount (i.e., as the synchronization process ends) for an instance of the synchronization process.

Each of these values may be stored for any suitable length of time, according to particular needs. For example, new instances of particular variables may be created so that previous values of the variables may be stored throughout an instance of the synchronization process (or longer, if appropriate). Additionally or alternatively, certain values may replace a previous value of an instance of a variable.

For purposes of describing the contents of memory unit 204, it has been assumed that machine 102 illustrated in FIG. 2 is operable to act as a master node. If, alternatively, machine 102 illustrated in FIG. 2 is acting as a slave node, machine 102 may store a portion or all of these and/or different variable values. As just one example, if machine 102 illustrated in FIG. 2 is acting as a slave node, machine 102 may store one or more of its clock time 206, a current time correction amount (e.g., time correction amount 208), its corrected time 210 (though this may simply be the reset output of clock 106 of the slave machine 102), and a new time correction amount (e.g., 220 (to be applied to clock 106 of the slave machine).

In certain embodiments, machine 102 includes messaging module 222, which be implemented using any suitable combination of hardware, firmware, and software. In general, messaging module 222 provides machine 102 the ability to communicate messages (e.g., messages 110) with other machines 102. Messaging module 222 may communicate Transmission Control Protocol (TCP)/IP socket-based messages; however, the present disclosure contemplates messaging module 222 communicating messages in any suitable manner according to particular needs. In certain embodiments, messaging module 222 is operable to communicate (e.g., by initiating messages and/or responding to other messages) messages (e.g., messages 110) to other machines at relatively if not extremely efficient rates. For example, certain messaging modules 222 may be able to achieve message exchanges at a rate of 3,000 messages per second (3 per millisecond) or faster.

As will be described below, synchronization module 108 may use messaging module 222 to communicate messages 110 for use in synchronization clocks 106. In certain embodiments, messages 110 comprise TCP/IP messages communicated over network sockets.

As described above, messaging module 222 may be operable to communicate (e.g., by initiating messages and/or responding to other messages) messages (e.g., messages 110) to other machines at efficient rates. This efficient message processing may result in faster round trip times and may affect the speed with which synchronization occurs. For example, faster messaging rates (both communication and processing rates) may result in more accurate corrections earlier in the iterations through a synchronization process of a synchronization instance, which may reduce the number of iterations for reaching an acceptable level of synchronization and use less processing power.

In operation of an example embodiment of system 100, it will be assumed that machine 102a is operating as the master node and machine 102b is operating as the slave node. A more detailed discussion of this operation is described below with reference to FIG. 4. Furthermore, although the example operation of system 100 is described with reference to only two machines 102, the present disclosure contemplates synchronization between or among any suitable number of machines 102, according to particular needs.

Machine 102a may initialize time correction amount 208. For example, synchronization module 108a of machine 102a may initialize time correction amount 208 (e.g., to zero). Machine 102a may communicate time correction amount 208 to machine 102b. For example, synchronization module 108a may interact with messaging module 222 of machine 102a to communicate a message 110a to machine 102b, message 110a comprising time correction amount 208. Synchronization module 108a may store the current clock time of clock 106a at which machine 102a communicated time correction amount 208 to machine 102b (i.e., first machine send time 212). For example, synchronization module 108a may store the current clock time of clock 106a at which machine 102a communicated message 110a (comprising time correction amount 208) to machine 102b.

Machine 102b may receive time correction amount 208 from machine 102a. For example, synchronization module 108b of machine 102b may receive message 110a communicated by machine 102a, message 110a comprising time correction amount 208. As a more particular example, messaging module 222 of machine 102b may receive message 110a from machine 102a, and may provide message 110a to synchronization module 108b. Synchronization module 108b may apply time correction amount 208 to the current clock time of clock 106b of machine 102b. For example, applying time correction amount 208 to the current clock time of clock 106b may include adding time correction amount 208 to the current time of clock 106b. The clock time resulting from applying time correction amount 208 to the current clock time of clock 106b may be referred to as the corrected time 210 of machine 102b. Machine 102b may communicate corrected time 210 of machine 102b to machine 102a. For example, synchronization module 108b may interact with messaging module 222 of machine 102b to communicate a message 110b to machine 102a, message 110b comprising corrected time 210 of machine 102b.

Machine 102a may receive corrected time 210 of machine 102b from machine 102b. For example, synchronization module 108a of machine 102a may receive message 110b from machine 102b, message 110b comprising corrected time 210 of machine 102b. As a more particular example, messaging module 222 of machine 102a may receive message 110b from machine 102b, and may provide message 110b to synchronization module 108a. Synchronization module 108a of machine 102a may store the current time of clock 106a when corrected time 210 of machine 102b is received (i.e., first machine receive time 214). For example, synchronization module 108a of machine 102a may store the current time of clock 106a when message 110b comprising corrected time 210 of machine 102b is received.

Synchronization module 108a of machine 102a may determine a difference 216 between first machine send time 212 (i.e., the time at which machine 102a communicated time correction amount 208 to machine 102b) and corrected time 210 of second machine 102b (i.e., received by machine 102a).

Synchronization module 108a of machine 102a may determine a round trip time 218. Round trip time 218 may be a difference between first machine send time 212 (e.g., as determined above) and first machine receive time 214 (e.g., as determined above). Synchronization module 108a of machine 102a may determine a new time correction amount 220. The new time correction amount 220 may be the sum of the difference 216 between first machine send time 212 and corrected time 210 of second machine 102b (e.g., as determined above) and half of round trip time 218. Half of round trip time 218 may be computed by dividing round trip time 218 by two, which may represent an estimate of the duration of one leg of the round trip.

In certain embodiments, the efficiency with which messaging modules 222 can process and communicate messages 110 may affect the quality of using the round trip time 218, as computed in this example, as an appropriate value for estimating each leg of the round trip (e.g., by dividing round trip time 218 by two). For example, more efficient messaging modules 222, which can process and communicate messages in an efficient manner, may improve the quality of using the round trip time 218, as computed in this example, as an appropriate value for estimating each leg of the round trip (e.g., by dividing round trip time 218 by two).

Synchronization module 108a of machine 102a may determine whether the new time correction amount 220 should be applied to machine 102b. For example, synchronization module 108a of machine 102a may determine whether the new time correction amount 220 should be communicated to machine 102b, so that machine 102b can apply the new time correction amount 220 to its current clock time 206. The determination of whether to communicate the new time correction amount 220 to machine 102b may be made in any suitable manner, according to particular needs. Example techniques for this determination are described below with reference to FIG. 4. In certain embodiments, if synchronization module 108a determines that new time correction amount 220 should be applied to second machine 102b, then synchronization module 108a may replace the value of time correction amount 208 with the value of new time correction amount 220; however, the present disclosure contemplates management of variable values in any suitable manner, according to particular needs.

If it is determined that the new time correction amount 220 should be applied to clock 106b, then, at a third time, a process may be initiated by which the new time correction amount 220 is applied to the clock time 206 of second machine 102b. For example, the process may return to the above-described step of communicating the time correction amount from machine 102a to machine 102b (replacing the initialized time correction amount 208 with the new time correction amount 220), or if machine 102b is making the determination of whether to apply the new time correction amount 220, then to the above-described step of machine 102b applying the time correction amount 208 to the clock time of clock 106b. If it is determined that the new time correction amount 220 should not be applied to clock 106b, then the method may end. In other words, it may be determined that the previous application of the time correction amount 208 is satisfactory such that clock 106a and 110b of machines 102a and 102b, respectively, are synchronized to an acceptable level.

As will be apparent from the above-described process, the process may proceed through one or more iterations until a desired level of synchronization between the times of clocks 106a and 110b of machines 102a and 102b, respectively, (e.g., by resetting clock 106b of machine 102b according to time correction amount 208 or by otherwise applying time correction amount 208 to clock 106b of machine 102b) is achieved.

Figure 3:
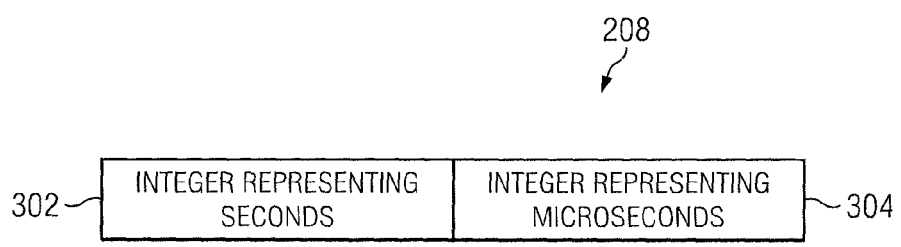
FIG. 3 illustrates an example data structure of a time correction amount, according to certain embodiments of the present disclosure.

FIG. 3 illustrates an example data structure of a time correction amount 208, according to certain embodiments of the present disclosure. In the illustrated example, time correction amount 208 includes two components: a first component 302 comprises integers representing seconds and a second component 304 comprises integers representing microseconds 304. Components 302, 304 may be written to a pair of environment variables, which may be available to any process on machine 102. For example, time correction amount 208 may be the clock time measured in seconds (i.e., first component 302) since 1970 with a second integer component in microseconds (i.e., second component 304). As just one particular example, [506792] may be an time correction amount 208, wherein the value [181] is first component 302 of integers representing seconds, and the value [506792] is second component 304 of integers representing microseconds. By adding time correction amount 208 to the clock time of machine 102 (e.g., to clock time of clock 106b of machine 102b), a process can synchronize itself with a leader machine (e.g., machine 102a) anywhere in the network, without interfering with a single system clock. Additionally or alternatively, clock 106b of machine 102b may be reset according to time correction amount 208.

Figure 4:
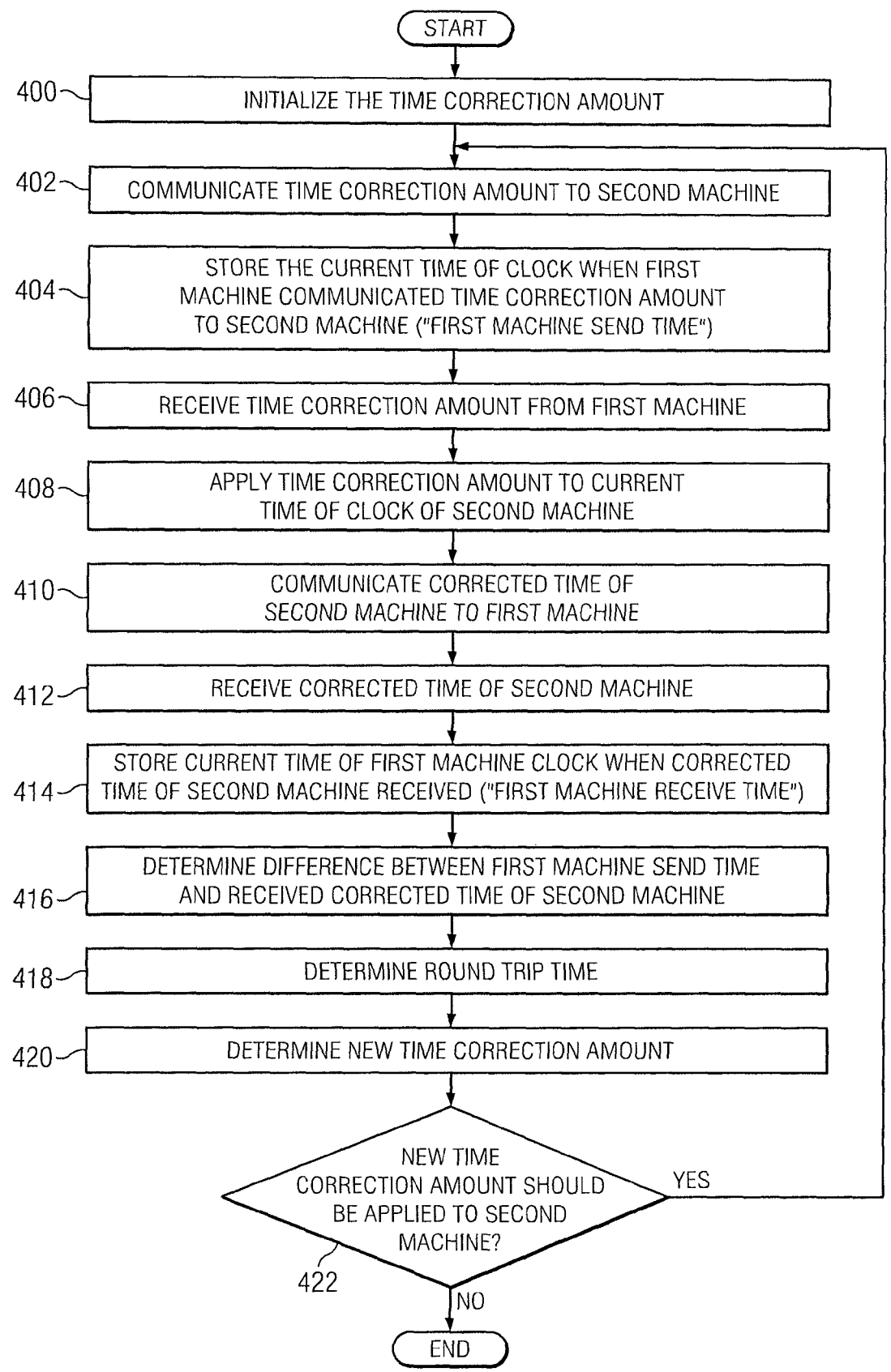
FIG. 4 illustrates an example method for standardizing clocks in a networked computing environment, according to certain embodiments of the present disclosure.

FIG. 4 illustrates an example method for standardizing clocks in a networked computing environment, according to certain embodiments of the present disclosure. In certain embodiments, this example method may be implemented using system 100. For purposes of this example, it will be assumed that machine 102a is operating as a master node and machine 102b is operating as a slave node. Thus, it will be assumed that clock 106b of machine 102b is being synchronized to clock 106a of machine 102a. Additionally, although the example process described below is described with reference to only two machines 102, the present disclosure contemplates synchronization between or among any suitable number of machines 102, according to particular needs.

At step 400, machine 102a initializes time correction amount 208. For example, synchronization module 108a of machine 102a may initialize time correction amount 208. In certain embodiments, synchronization module 108a of machine 102a initializes time correction amount 208 to zero. For a particular instance of synchronization, the value zero may provide an appropriate initialization value for time correction amount 208 for the first iteration through the synchronization process. However, the present disclosure contemplates initializing time correction amount to any suitable value, according to particular needs.

At step 402, machine 102a may communicate time correction amount 208 to machine 102b. For example, synchronization module 108a may interact with messaging module 222 of machine 102a to communicate a message 110a to machine 102b, message 110a comprising time correction amount 208. The time correction amount 208 communicated from machine 102a to machine 102b may be the current time correction amount 208. For example, if this is the first pass through a synchronization process of a synchronization instance, time correction amount 208 may be the amount to which synchronization module 108a of machine 102a initialized time correction amount 208 (i.e., at step 400).

At step 404, synchronization module 108a may store the current clock time of clock 106a at which machine 102a communicated time correction amount 208 to machine 102b (i.e., first machine send time 212). For example, synchronization module 108a may store the current clock time of clock 106a at which machine 102a communicated message 110a (comprising time correction amount 208) to machine 102b.

At step 406, machine 102b receives time correction amount 208 from machine 102a. For example, synchronization module 108b of machine 102b may receive message 110a communicated by machine 102a, message 110a comprising time correction amount 208. As a more particular example, messaging module 222 of machine 102b may receive message 110a from machine 102a, and may provide message 110a to synchronization module 108b.

At step 408, synchronization module 108b may apply time correction amount 208 to the current clock time of clock 106b of machine 102b. In certain embodiments, synchronization module 108b may interact with other suitable components of machine 102b, if appropriate, to cause clock 106b to be adjusted according to time correction amount 208. For example, applying time correction amount 208 to the current clock time of clock 106b may include adding time correction amount 208 to the current time of clock 106b. The clock time resulting from applying time correction amount 208 to the current clock time of clock 106b may be referred to as corrected time 210 of machine 102b. Thus, clock 106b of machine 102b may be reset according to the determined corrected time 210. Alternatively, rather than actually resetting clock 106b, machine 102b may simply store corrected time 210 amount and apply it to the output of clock 106b when the clock time 206 of clock 106b is requested by another suitable component of machine 102b.

At step 410, machine 102b may communicate corrected time 210 of machine 102b to machine 102a. For example, synchronization module 108b may interact with messaging module 222 of machine 102b to communicate a message 110b to machine 102a, message 110b comprising corrected time 210 of machine 102b.

At step 412, machine 102a may receive corrected time 210 of machine 102b from machine 102b. For example, synchronization module 108a of machine 102a may receive message 110b from machine 102b, message 110b comprising corrected time 210 of machine 102b. As a more particular example, messaging module 222 of machine 102a may receive message 110b from machine 102b, and may provide message 110b to synchronization module 108a. At step 414, synchronization module 108a of machine 102a may store the current time of clock 106a when corrected time 210 of machine 102b is received (i.e., first machine receive time 214). For example, synchronization module 108a of machine 102a may store the current time of clock 106a when message 110b comprising corrected time 210 of machine 102b is received.

At step 416, synchronization module 108a of machine 102a may determine a difference 216 between first machine send time 212 (i.e., the time at which machine 102a communicated time correction amount 208 to machine 102b) and corrected time 210 of second machine 102b (i.e., received by machine 102a at step 412). For example, synchronization module 108a may subtract corrected time 210 of second machine 102b from first machine send time 212 to determine this difference 216.

At step 418, synchronization module 108a of machine 102a may determine a round trip time 218. Round trip time 218 may be a difference between first machine send time 212 (e.g., as determined at step 404) and first machine receive time 214 (e.g., as determined at step 414). In certain embodiments, round trip time 218 may be the absolute value of the difference between first machine send time 212 (e.g., as determined at step 404) and first machine receive time 214 (e.g., as determined at step 414). The two messages 110 that form the basis of this round trip time 218 calculation (i.e., message 110a communicated from machine 102a to machine 102b and message 110b communicated by machine 102b to machine 102a) may be communicated on the same socket of network 104 and there may be minimal turnaround time on machine 102b between the two messages. Thus, the use of the send time of message 110a and the receive time of message 110b may provide a reasonable estimate of the round trip time of communicating a message between machines 102a and 102b.

In certain embodiments, the efficiency with which messaging modules 222 can process and communicate messages 110 may affect the quality of using the round trip time 218, as computed in this example, as an appropriate value for estimating each leg of the round trip (e.g., by dividing round trip time 218 by two). For example, more efficient messaging modules 222, which can process and communicate messages in an efficient manner, may improve the quality of using the round trip time 218, as computed in this example, as an appropriate value for estimating each leg of the round trip (e.g., by dividing round trip time 218 by two).

At step 420, synchronization module 108a of machine 102a may determine a new time correction amount 220. The new time correction amount 220 may be the sum of the difference 216 between first machine send time 212 and corrected time 210 of second machine 102b (i.e., the difference 216 determined above at step 416) and half of round trip time 218. Half of round trip time 218 may be computed by dividing round trip time 218 determined at step 418 by two, which may represent an estimate of the duration of one leg of the round trip. Estimating the duration of one leg of the round trip in this manner may provide a relatively accurate estimate since the estimate is derived from like messages (e.g., messages 110) that are sent on potentially the same socket within a short time period.

At step 422, synchronization module 108a of machine 102a may determine whether the new time correction amount 220 should be applied to machine 102b. For example, synchronization module 108a of machine 102a may determine whether the new time correction amount 220 should be communicated to machine 102b, so that machine 102b can apply the new time correction amount 220 to its current clock time 206. The determination of whether to communicate the new time correction amount 220 to machine 102b may be made in any suitable manner, according to particular needs. In certain embodiments, if synchronization module 108a determines that new time correction amount 220 should be applied to second machine 102b, then synchronization module 108a may replace the value of time correction amount 208 with the value of new time correction amount 220; however, the present disclosure contemplates management of variable values in any suitable manner, according to particular needs.

In certain embodiments, machine 102a may store a predetermined threshold, which one may think of as a known delta from the clock time 206 of clock 106a of machine 102a, it being acceptable if the clock time 206 of clock 106b of machine 102b is synchronized within that known delta. For example, synchronization module 108a may determine whether the new time correction amount 220 should be applied to the clock time 206 corresponding to the machine 102b by determining whether the new time correction amount 220 is within the predetermined threshold and determining that the new time correction amount 220 should be applied to the clock time 206 corresponding to machine 102b when the new time correction amount 220 is within (or equal to, if appropriate) the predetermined threshold.

Additionally or alternatively, in certain embodiments, synchronization module 108a may determine whether the new time correction amount 220 should be applied to the clock time 206 of the machine 102b by determining whether the new time correction amount 220 is less than the absolute value of the previous time correction amount 208 and determining that the new time correction amount 220 should be applied to the clock time 206 of machine 102b when the new time correction amount 220 is less than the absolute value of the previous time correction amount 208.

While the determination of whether the new time correction amount 220 should be applied to the clock time 206 of the machine 102b has been described as being performed by machine 102a (i.e., the master node in this example), the present disclosure contemplates machine 102a communicating the new time correction amount 220 to machine 102b for machine 102b to determine whether the new time correction amount 220 should be applied to the current clock time 206 (which at this point has been reset at least once as described above at step 408) of clock 106b of machine 102b. These decisions could be made by machine 102b prior to applying the new time correction amount 220 at step 408, for example.

If it is determined at step 422 (e.g., by synchronization module 108a of machine 102a or by synchronization module 108b of machine 102b) that the new time correction amount 220 should be applied to clock 106b, then, at a third time, a process may be initiated by which the new time correction amount 220 is applied to the clock time 206 of second machine 102b. For example, the method may return either to step 402 (e.g., if system 100 is implemented such that machine 102a determines whether time correction amount 208 should be applied to clock 106b of machine 102b), as shown in FIG. 4, or to step 408 (e.g., if system 100 is implemented such that machine 102b determines whether time correction amount 208 should be applied to clock 106b of machine 102b).

If it is determined at step 422 (e.g., by synchronization module 108a of machine 102a or by synchronization module 108b of machine 102b) that the new time correction amount 220 should not be applied to clock 106b, then the method may end. In other words, it may be determined that the previous application of the time correction amount 208 is satisfactory such that clock 106a and 110b of machines 102a and 102b, respectively, are synchronized to an acceptable level.

As will be apparent from the above-described process, the process may proceed through one or more iterations until a desired level of synchronization between the times of clocks 106a and 110b of machines 102a and 102b, respectively, (e.g., by resetting clock 106b of machine 102b according to time correction amount 208 or by otherwise applying time correction amount 208 to clock 106b of machine 102b) is achieved. In certain embodiments, a time-out mechanism, which may be implemented in any suitable manner, may also be employed to prevent the synchronization process from taking too long or from being stuck in an endless loop. For example, for an instance of the synchronization process, synchronization module 108a and/or 108b may track the number of iterations through the above-described synchronization process and, once a predetermined number of iterations have occurred, terminate the process. As another example, synchronization module 108a and/or 108b may track the elapsed time since the instance of the synchronization process began and terminate the process if the instance has not completed within a predetermined amount of time.

Additionally, although a particular method for standardizing clocks in a networked computing environment has been described with reference to FIG. 4, the present disclosure contemplates any suitable method for standardizing clocks in a networked computing environment in accordance with the present disclosure. Thus, certain of the steps described with reference to FIG. 4 may take place substantially simultaneously and/or in different orders than as shown and described. Moreover, components of system 100 may use methods with additional steps, fewer steps, and/or different steps, so long as the methods remain appropriate. Furthermore, although particular components of system 100 are described as performing particular steps of the method described with reference to FIG. 4, the present disclosure contemplates any suitable components of system 100 and/or components of other embodiments of the present disclosure performing the steps.

Certain embodiments of the present disclosure may be designed to run in a thread within a bridge (e.g., ccirmtd, DIA, etc.) or as a standalone process on one or more machines 102 in a given enterprise where clock synchronization is desirable.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A method, comprising:
(a) communicating, at a first time and from a first machine to a second machine, a first time correction amount, each of the first machine and the second machine keeping a corresponding clock time;
(b) receiving, at a second time and from the second machine, a corrected time of the second machine, the corrected time of the second machine being a current clock time of the second machine corrected according to the first time correction amount;
(c) determining a difference between the first time and the corrected time of the second machine;
(d) determining a round trip time, the round trip time being a difference between the first time and the second time;
(e) determining a next time correction amount comprising a sum of the difference between the first time and the corrected time of the second machine and half of the round trip time;
(f) determining whether the next time correction amount should be applied to the clock time corresponding to the second machine; and
(g) performing, when a determination is made that the next time correction amount should be applied to the clock time corresponding to the second machine, steps (a) through (f), replacing the first time correction amount with the next time correction amount.

2. The method of claim 1, wherein steps (a) through (f) are performed in a temporal order other than (a), (b), (c), (d), (e), and (f).

3. A method, comprising:
communicating, at a first time and from a first machine to a second machine, a first time correction amount, each of the first machine and the second machine keeping a corresponding clock time;
receiving, at a second time and from the second machine, a first corrected time of the second machine, the first corrected time of the second machine being a first current clock time of the second machine corrected according to the first time correction amount;
determining a difference between the first time and the first corrected time of the second machine;
determining a first round trip time, the first round trip time being a difference between the first time and the second time;
determining a second time correction amount comprising a sum of the difference between the first time and the first corrected time of the second machine and half of the first round trip time;
determining whether the second time correction amount should be applied to the clock time corresponding to the second machine; and
initiating, at a third time, a process by which the second time correction amount is applied to the clock time corresponding to the second machine when it is determined that the second time correction amount should be applied to the clock time corresponding to second machine.

4. The method of claim 3, comprising:
receiving, at a fourth time and from the second machine, a second corrected time of the second machine, the second corrected time of the second machine being a second current clock time of the second machine corrected according to the second time correction amount;
determining a difference between the third time and the second corrected time of the second machine;

determining a second round trip time, the second round trip time being a difference between the third time and the fourth time;

determining a third time correction amount comprising a sum of the difference between the third time and the second corrected time of the second machine and half of the second round trip time;

determining whether the third time correction amount should be applied to the clock time corresponding to the second machine.

5. The method of claim 3, wherein:

determining whether the second time correction amount should be applied to the clock time corresponding to the second machine comprises determining that the second time correction amount should not be applied to the clock time corresponding to the second machine; and the method comprises not communicating the second time correction amount to the second machine.

6. The method of claim 3, wherein:

determining whether the second time correction amount should be applied to the clock time corresponding to the second machine comprises determining that the second time correction amount should not be applied to the clock time corresponding to the second machine; and initiating, at a third time, a process by which the second time correction amount is applied to the clock time corresponding to the second machine when it is determined that the second time correction amount should be applied to the clock time corresponding to second machine comprises communicating, at the third time, the second time correction amount to the second machine.

7. The method of claim 3, wherein the second machine is operable to reset its corresponding clock time according to the corrected clock time.

8. The method of claim 3, wherein determining whether the second time correction amount should be applied to the clock time corresponding to the second machine comprises:

determining whether the second time correction amount is within a predetermined threshold; and determining that the second time correction amount should be applied to the clock time corresponding to the second machine when it is determined that the second time correction amount is within the predetermined threshold.

9. The method of claim 3, wherein determining whether the second time correction amount should be applied to the clock time corresponding to the second machine comprises:

determining whether the second time correction amount is less than the absolute value of the first time correction amount; and determining that the second time correction amount should be applied to the clock time corresponding to the second machine when it is determined that the second time correction amount is less than the absolute value of the first time correction amount.

10. The method of claim 3, wherein the first time correction amount communicated from the first machine to the second machine comprises an initial communication of a time correction amount to the second machine, the value of the first time correction amount being zero.

11. The method of claim 3, wherein each of the first time, the second time, the third time, the clock time corresponding to the first machine, the clock time corresponding to the second machine, and the corrected time comprise a seconds component and a microseconds component.

12. The method of claim 3, wherein the first, second, and third times are determined according to the clock time corresponding to the first machine.

13. A system, comprising:

one or more memory units; and one or more processors operable to:

communicate, at a first time and from a first machine to a second machine, a first time correction amount, each of the first machine and the second machine keeping a corresponding clock time;

receive, at a second time and from the second machine, a first corrected time of the second machine, the first corrected time of the second machine being a first current clock time of the second machine corrected according to the first time correction amount;

determine a difference between the first time and the first corrected time of the second machine;

determine a first round trip time, the first round trip time being a difference between the first time and the second time;

determine a second time correction amount comprising a sum of the difference between the first time and the first corrected time of the second machine and half of the first round trip time;

determine whether the second time correction amount should be applied to the clock time corresponding to the second machine; and initiate, at a third time, a process by which the second time correction amount is applied to the clock time corresponding to the second machine when it is determined that the second time correction amount should be applied to the clock time corresponding to second machine.

14. The system of claim 13, wherein the one or more processors are operable to:

receive, at a fourth time and from the second machine, a second corrected time of the second machine, the second corrected time of the second machine being a second current clock time of the second machine corrected according to the second time correction amount;

determine a difference between the third time and the second corrected time of the second machine;

determine a second round trip time, the second round trip time being a difference between the third time and the fourth time;

determine a third time correction amount comprising a sum of the difference between the third time and the second corrected time of the second machine and half of the second round trip time;

determine whether the third time correction amount should be applied to the clock time corresponding to the second machine.

15. The system of claim 13, wherein:

determining whether the second time correction amount should be applied to the clock time corresponding to the second machine comprises determining that the second time correction amount should not be applied to the clock time corresponding to the second machine; and the one or more processors are operable to not communicate the second time correction amount to the second machine.

16. The system of claim 13, wherein:

determining whether the second time correction amount should be applied to the clock time corresponding to the second machine comprises determining that the second time correction amount should not be applied to the clock time corresponding to the second machine; and initiating, at a third time, a process by which the second time correction amount is applied to the clock time corresponding to the second machine when it is determined that the second time correction amount should be applied to the clock time corresponding to second machine comprises communicating, at the third time, the second time correction amount to the second machine.

17. The system of claim 13, wherein the second machine is operable to reset its corresponding clock time according to the corrected clock time.

18. The system of claim 13, wherein determining whether the second time correction amount should be applied to the clock time corresponding to the second machine comprises:
   determining whether the second time correction amount is within a predetermined threshold; and
   determining that the second time correction amount should be applied to the clock time corresponding to the second machine when it is determined that the second time correction amount is within the predetermined threshold.

19. The system of claim 13, wherein determining whether the second time correction amount should be applied to the clock time corresponding to the second machine comprises:
   determining whether the second time correction amount is less than the absolute value of the first time correction amount; and
   determining that the second time correction amount should be applied to the clock time corresponding to the second machine when it is determined that the second time correction amount is less than the absolute value of the first time correction amount.

20. The system of claim 13, wherein the first time correction amount communicated from the first machine to the second machine comprises an initial communication of a time correction amount to the second machine, the value of the first time correction amount being zero.

21. The system of claim 13, wherein each of the first time, the second time, the third time, the clock time corresponding to the first machine, the clock time corresponding to the second machine, and the corrected time comprise a seconds component and a microseconds component.

22. The system of claim 13, wherein the first, second, and third times are determined according to the clock time corresponding to the first machine.

* * * * *